(12) United States Patent
Hasegawa et al.

(10) Patent No.: US 7,375,336 B2
(45) Date of Patent: May 20, 2008

(54) ZNS(AG) SCINTILLATION DETECTOR

(75) Inventors: Ichiro Hasegawa, Naka-gun (JP); Kenji Izaki, Naka-gun (JP); Hirohide Kobayashi, Naka-gun (JP); Kazuo Ino, Naka-gun (JP); Nobuyuki Kanazawa, Hitachi (JP)

(73) Assignee: Japan Nuclear Cycle Development Institute, Ibaraki-Ken (JP)

( * ) Notice: Subject to any disclaimer, the term of this patent is extended or adjusted under 35 U.S.C. 154(b) by 0 days.

(21) Appl. No.: 11/237,852

(22) Filed: Sep. 29, 2005

(65) Prior Publication Data
US 2006/0208197 A1   Sep. 21, 2006

(30) Foreign Application Priority Data
Mar. 18, 2005   (JP) .............................. 2005-080026

(51) Int. Cl.
*G01T 1/20*   (2006.01)
*G01T 1/208*  (2006.01)

(52) U.S. Cl. .............................. 250/361 R; 250/370.02; 250/370.11

(58) Field of Classification Search ........... 250/370.11, 250/370.02, 361 R
See application file for complete search history.

(56) References Cited

U.S. PATENT DOCUMENTS

| | | | | |
|---|---|---|---|---|
| 3,988,587 | A * | 10/1976 | Shreve et al. ............... | 250/364 |
| 4,295,045 | A * | 10/1981 | Minami ...................... | 250/255 |
| 4,804,514 | A * | 2/1989 | Bartko et al. ............... | 376/154 |
| 4,808,827 | A * | 2/1989 | Woollam .................... | 250/370.02 |
| 4,871,914 | A * | 10/1989 | Simon et al. ............... | 250/370.02 |
| 4,916,320 | A * | 4/1990 | Wunderly et al. .......... | 250/483.1 |
| 5,149,971 | A * | 9/1992 | McElhaney et al. ........ | 250/361 R |
| 5,317,158 | A * | 5/1994 | McElhaney et al. ........ | 250/367 |
| 2002/0079460 | A1* | 6/2002 | Uezu et al. ................. | 250/395 |
| 2004/0067355 | A1* | 4/2004 | Yadav et al. ................ | 428/323 |

OTHER PUBLICATIONS

Yamamoto, S., K. Tarutani, K. Yamasoto, D. Iskandar, and T. Iida. "Development of a Continuous Radon Concentration Monitoring System in Underground Soil". IEEE Transactions on Nuclear Science: vol. 48, No. 3, Jun. 2001.*
Hasegawa, I. et al., "Application of pulse height discrimination method using ZnS(Ag) scintillation detector", Preliminary Report, *Third Scientific Meeting of Japanese Society of Radiation Safety Management* (JRSM), Dec. 1-3, 2004.
*Nuclear Energy Handbook* (new edition), "3.4 Measurement of Radioactive Rays", pp. 73 to 78, Ohm-sha, Japan, Mar. 30, 1989.

* cited by examiner

*Primary Examiner*—David P. Porta
*Assistant Examiner*—Casey Bryant
(74) *Attorney, Agent, or Firm*—Wenderoth, Lind & Ponack, L.L.P.

(57) ABSTRACT

A ZnS (Ag) scintillation detector comprises a ZnS (Ag) scintillators layer 22 which is excited by incident α-rays and emits a scintillator light, a photomultiplier tube 16 which converts the scintillator light into an electric pulse signal, and a counting rate meter 34 which counts the obtained pulse signal. The scintillator layer has a thickness which is not less than a range of α-rays from α-ray emitting nuclides (natural radioactive nuclides) to be separated, which enables energy absorption of α-rays from the α-ray emitting nuclides to be separated to entirely occur in the scintillator layer, and which enables light shielding of the scintillator light generated in the scintillator layer by the scintillator layer itself to be neglected. A pulse height discrimination circuit 32 is further provided in a preceding stage of the counting rate meter. Thereby, the effect of the natural radioactive nuclides can be reduced and the contamination control can be efficiently and smoothly performed.

2 Claims, 3 Drawing Sheets

Particle diameter: 10μm

Particle diameter: 5μm

ZNS(AG) SCINTILLATION DETECTOR

FIELD OF THE INVENTION

The present invention relates to a scintillation detector in which a ZnS (Ag) scintillator is used so as to make it possible to perform energy discrimination of α-rays. The ZnS (Ag) scintillation detector is capable of reducing the effect of natural radioactive nuclides on measurement, and hence, is useful as an α-ray survey meter used for the contamination control, for example, in the inside of nuclear facilities.

BACKGROUND OF THE INVENTION

The ZnS (Ag) scintillation detector is relatively durable and inexpensive, and hence, is most extensively used for the radiation control of α-rays in nuclear facilities and the like. The ZnS (Ag) scintillator is a crystal (powder) with a trace of Ag as an activator added to ZnS, and emits scintillator light when excited by α-rays (see, for example, "Nuclear Energy Handbook (new edition)", 3.4 Measurement of Radioactive Rays, p. 73 to 78, published on Mar. 30, 1989, by Ohm-sha). The conventional detector measures the radioactivity of α-ray emitting nuclides contained in an object to be measured merely by counting pulse signals which are obtained by amplifying the scintillator light.

The above described ZnS (Ag) scintillation detector has a problem that the counting is affected by α-rays from natural radioactive nuclides (progenies of radon) in a period that static electricity is easily generated, and in an ill-ventilated place. This is because the conventional ZnS (Ag) scintillation detector is not provided with a pulse height discrimination function, and hence, is unable to discriminate between α-rays from a radioactive material to be detected and α-rays from progenies of radon, whereby the conventional ZnS (Ag) scintillation detector counts all the α-rays.

In order to properly perform the contamination control in nuclear facilities and the like, it is necessary to eliminate the effect of natural radioactive nuclides as much as possible, and to perform the counting of α-rays only from the radioactive material to be detected. However, this is difficult to be effected in the conventional ZnS (Ag) scintillation detector without the pulse height discrimination function.

SUMMARY OF THE INVENTION

An object of the present invention is to enable pulse height discrimination of α-rays to be performed, while the convenience of the ZnS (Ag) scintillation detector being effectively utilized, and thereby to enable the effect of natural radioactive nuclides to be reduced and the efficient and smooth contamination control to be performed.

The inventors of the present invention have attempted to perform energy discrimination of α-rays, paying attention to the fact that the energy spectra of α-rays can be measured in principle even by using the ZnS (Ag) scintillator, and that the energy difference between α-rays from the radioactive material to be detected and α-rays from (a part of) progenies of radon is as large as about several MeV, and have examined the possibility of reducing the effect of α-rays from progenies of radon in the ZnS (Ag) scintillation detector. As a result of repeating experiments using various kinds of ZnS (Ag) scintillators, it has been found that a ZnS (Ag) scintillator having a smaller particle size and greater thickness has a smaller influence rate of α-rays from progenies of radon. The present invention has been accomplished on the basis of the acquired information concerning such phenomena.

According to the present invention, there is provided a ZnS (Ag) scintillation detector comprising a ZnS (Ag) scintillator layer which is excited by incident α-rays and emits a scintillator light, a photomultiplier tube which converts the scintillator light into an electric pulse signal, and a counting rate meter which counts the obtained pulse signal, wherein the ZnS (Ag) scintillator layer has a thickness which is not less than a range of α-rays from α-ray emitting nuclides to be separated, which enables energy absorption of α-rays from the α-ray emitting nuclides to be separated to entirely occur in the scintillator layer, and which enables the light shielding of the scintillator light generated in the scintillator layer by the scintillator itself to be neglected, and wherein a pulse height discrimination circuit is added to a preceding stage of the counting rate meter to thereby perform pulse height discrimination of signals due to α-rays in an energy region to be detected and guide the discriminated signals to the counting rate meter.

It is preferred that the α-ray emitting nuclides to be separated are progenies of radon which are natural radioactive nuclides, and that the scintillator layer has a structure in which the thickness of the layer is greater than 5 mg/cm$^2$ (more preferably 7 to 10 mg/cm$^2$), and ZnS (Ag) scintillators with a particle diameter of 5 μm or less are evenly packed in the layer. Further, the scintillation detector according to the present invention preferably has a structure in which a boundary value is defined between the energy region of α-rays from a radioactive material to be detected and the energy region of α-rays from the progenies of radon, whereby an influence rate of α-rays from the progenies of radon is reduced by the pulse height discrimination circuit.

In the ZnS (Ag) scintillation detector according to the present invention, since the ZnS (Ag) scintillator layer is arranged to have a thickness corresponding to the range of α-rays from α-ray emitting nuclides to be separated, it is possible to perform pulse height discrimination of α-rays and thereby to reduce the counting of α-rays from the natural radioactive nuclides by about several tens of percent. Thus, by the use of the ZnS (Ag) scintillation detector, it is possible to efficiently and smoothly perform the contamination control due to radioactive materials in nuclear facilities and the like.

PREFERRED EMBODIMENTS OF THE INVENTION

Figure 1:
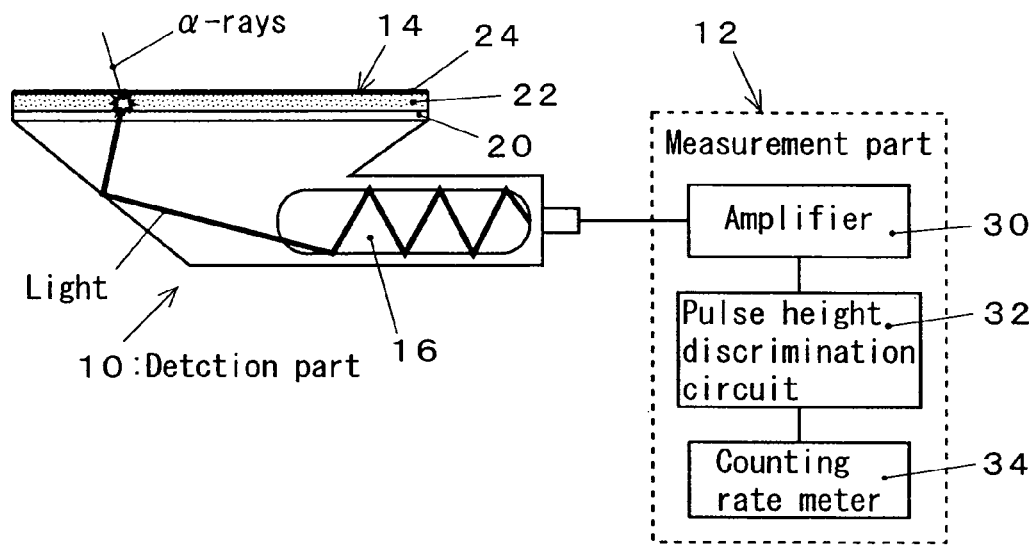
FIG. 1 is an explanatory view showing a typical embodiment of a ZnS (Ag) scintillation detector according to the present invention.

FIG. 1 is an explanatory view showing a typical embodiment of a ZnS (Ag) scintillation detector according to the present invention. The ZnS (Ag) scintillation detector is constituted by a detection part 10 and a measurement part 12. The detection part 10 comprises a scintillator sheet 14 which is excited by incident α-rays and emits a scintillator light, and a photomultiplier tube 16 which converts the guided scintillator light into an electric pulse signal. Here, the scintillator sheet 14 has a structure in which a ZnS (Ag) scintillator layer 22 is formed on one side of a transparent plastic film 20, and further a light shielding film 24 is provided on the surface of the scintillator layer 22. The measurement part 12 is a part for processing the obtained pulse signal, and comprises an amplifier 30 which amplifies the electric pulse signal from the photomultiplier tube 16, a pulse height discrimination circuit 32 which performs pulse height discrimination of the pulse signal amplified by the amplifier 30, and a counting rate meter 34 which performs a counting of the pulse signal subjected to the pulse height discrimination. In order to guide the scintillator light generated by the scintillator sheet 14 into the photomultiplier tube 16, the space propagation of light may be used, or an optical fiber, an optical guide and the like may be used.

In the present invention, the ZnS (Ag) scintillator layer 22 applied to the scintillator sheet 14 needs to be provided so as to have a thickness not less than the range of α-rays from the α-ray emitting nuclides to be separated (but so as not to be too thick). This is because energy absorption of the α-rays from the α-ray emitting nuclides to be separated is made to entirely occur in the scintillator layer and, in addition, light generated by the scintillator layer is hardly light-shielded by the scintillator itself. By the use of the scintillator sheet meeting such conditions, the quantity of light emitted by the scintillator, i.e., the height of the pulse signal is made to correspond to the energy of α-ray. Accordingly, the function of discriminating the energy of α-rays can be obtained by adding the pulse height discrimination circuit 32 to the measurement part.

Figure 2:
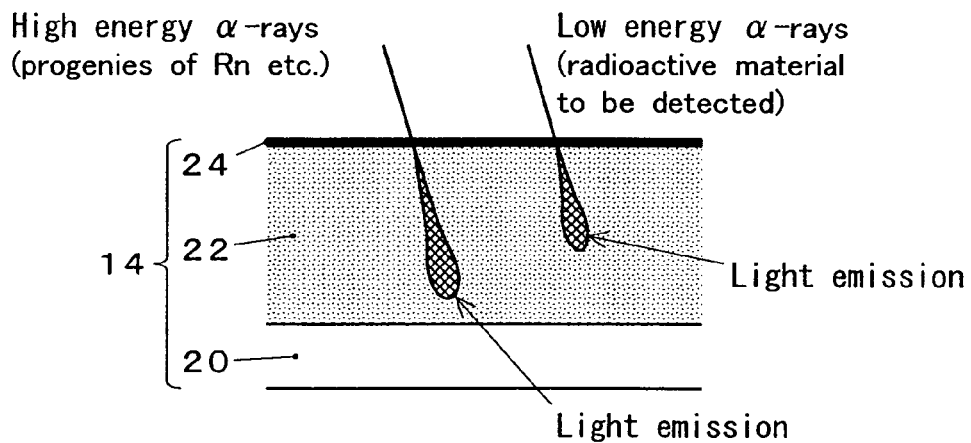
FIG. 2 is a schematic view showing a state of light emission in a scintillator sheet.

FIG. 2 schematically shows a state of light emission in the scintillator sheet. As described above, the scintillator sheet 14 has a structure in which the scintillator layer 22 is formed by applying a mixture of the ZnS (Ag) scintillator and a binder to one side of the transparent plastic film 20, and the light shielding film 24 is further provided on the surface of the scintillator layer 22. Here, the light shielding film 24 is provided to prevent the intrusion of external light by shielding the external light, and to make only the scintillator light generated in the scintillator layer guided to the photomultiplier tube and detected.

The α-rays generated by the radioactive material to be detected have a relatively low energy and short range, as compared with the α-rays from progenies of radon and the like, which are natural radioactive nuclides. Accordingly, as shown in FIG. 2, the number of scintillator particles excited is different due to such difference in the range, and hence, the quantity of light emitted by the scintillator is also different.

Figure 3A:
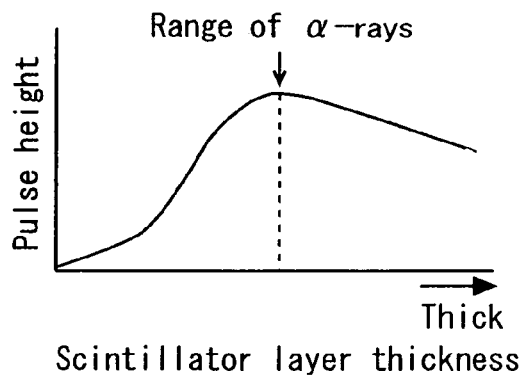
FIGS. 3A and 3B are graphs showing a relationship between the thickness of scintillator layer and the pulse height and a relationship between the particle diameter of scintillator and the full width at half maximum (FWHM), respectively.
Figure 3B:
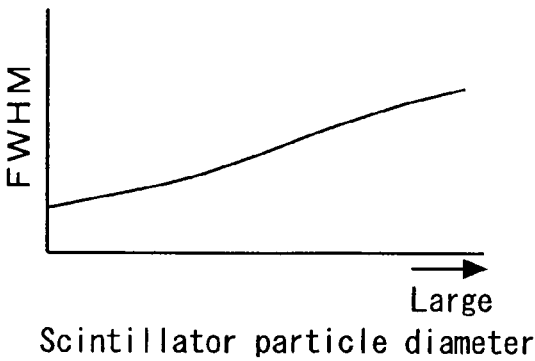

FIGS. 3A and 3B show the effects of the thickness of scintillator layer and the particle diameter of scintillator on the pulse height and the FWHM. FIG. 3A shows a relationship between the thickness of scintillator layer and the pulse height. In the case where the thickness of scintillator layer is less than the range of α-rays, the quantity of light emitted by the scintillator is increased and the height of pulse signal is made higher, as the thickness of scintillator layer is increased. In the case where the thickness of scintillator layer is greater than the range of α-rays, the quantity of light emitted by the scintillator is stabilized, but the light absorption occurs in the scintillator layer and thereby the height of pulse signal is made lower, as the thickness of scintillator layer is increased. FIG. 3B shows a relationship between the particle diameter of scintillator and the FWHM. It can be seen from FIG. 3B that the FWHM in the α-ray spectrum is reduced and the resolution is improved, as the particle diameter is made smaller. This is because the quantity of light emitted by the scintillator is more stabilized, as the particle diameter of the scintillator is made smaller.

For example, in the scintillator sheet used for the contamination control in nuclear fuel facilities, the thickness of scintillator layer may be preferably set to about 8 mg/cm$^2$ (corresponding to the range of α-rays of 8 MeV) in consideration of "the energy of α-rays from the radioactive material to be detected being about 4 to 6 MeV" and "the energy of α-rays from natural radioactive nuclides (progenies of radon) being about 6 to 8 MeV". In the case where the thickness of scintillator layer is set as described above, the pulse height discrimination level is set to be performed by taking 6 MeV which is the maximum energy of α-rays from the radioactive material to be detected, as a boundary value, and only a signal with the energy of 6 MeV or less is set to be inputted into the counting rate meter, whereby the α-rays from natural radioactive nuclides, which have the energy of about 8 MeV, can be hardly counted. That is, it is possible to eliminate the effect of natural radioactive nuclides, and to highly accurately measure the α-rays from the radioactive material to be detected. Further, a structure in which the scintillator has a particle size of 5 μm or less and is evenly packed, is preferred.

EXAMPLE

Figure 4A:
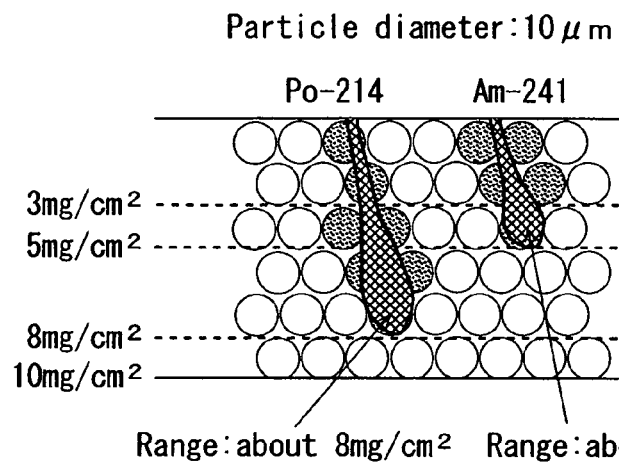
FIGS. 4A and 4b are explanatory views schematically showing a relationship between the thickness of scintillator layer, the particle diameter, and the quantity of emitted light.
Figure 4B:
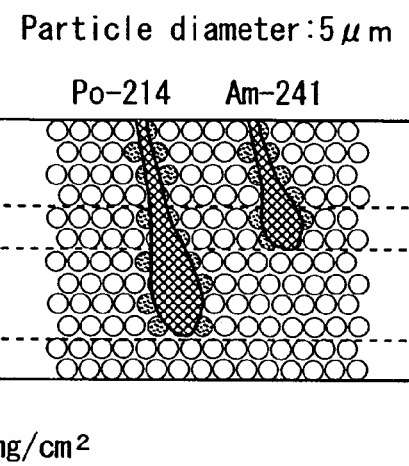

FIGS. 4A and 4B schematically show a relationship between the scintillator layer thickness, the particle diameter of scintillator, and the quantity of emitted light. FIG. 4A shows the case where the particle diameter of scintillator is large (for example 10 μm), and FIG. 4B shows the case where the particle diameter of scintillator is small (for example 5 μm). Here, the α-ray emitting nuclide to be separated is Po-214. The energy of α-rays of Am-241 (the radioactive material to be detected) is about 5.5 MeV (range: about 5 mg/cm$^2$), and the energy of α-rays of Po-214 (progeny of radon) is about 7.7 MeV (range: about 8 mg/cm$^2$). In FIGS. 4A and 4B, the particles denoted by dots represent the ZnS (Ag) scintillators which are excited by the incidence of α-rays and emit light. As can be seen from FIGS. 4A and 4B, in the case of the scintillator layer with a thickness of 5 mg/cm$^2$ or less, the number of scintillators which are made to emit light by α-rays of Am-241 is not significantly different from the number of scintillators which are made to emit light by α-rays of Po-214, and hence, the quantity of emitted light (pulse height) is not significantly different between Am-241 and Po-214. However, in the case of the scintillator layer with a thickness exceeding 8 mg/cm$^2$, the number of scintillators which are made to emit light by α-rays of Am-241 is clearly different from the number of scintillators which are made to emit light by α-rays of Po-214, whereby the quantity of emitted light (pulse height) is made to correspond to the energy (the range) of incident α-rays.

As a result, the thickness of the scintillator layer is most preferably made to coincide with the range of α-rays from the α-ray emitting nuclide to be separated (i.e. about 8 mg/cm²), in which thickness the quantity of light emitted by α-rays of Po-214 can be stabilized, and the absorption of light emitted by α-rays of Am-241 in the scintillator layer can be reduced.

Figure 5:
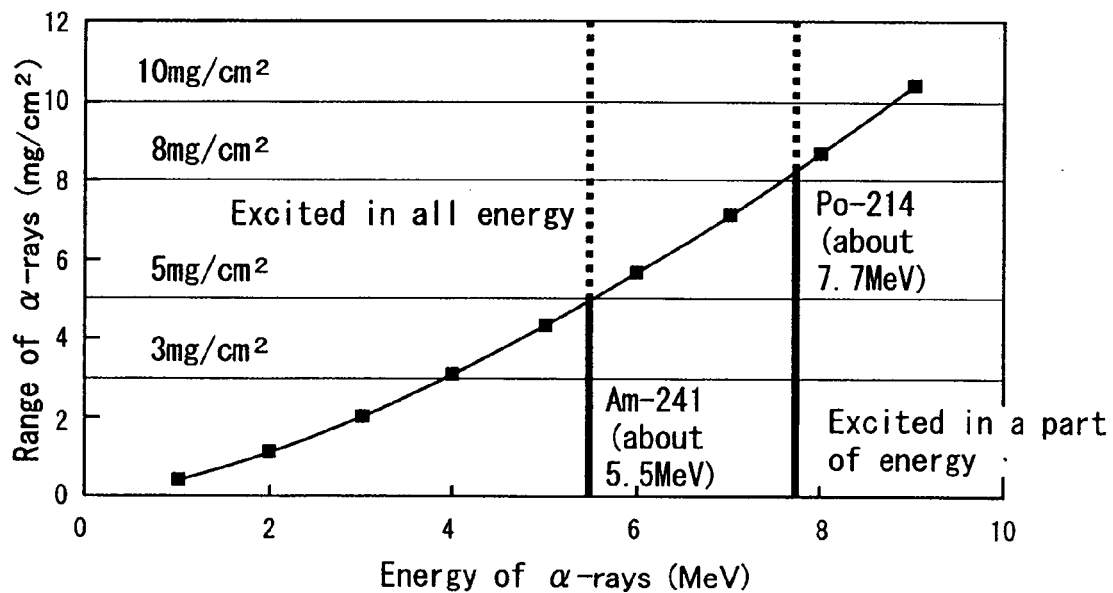
FIG. 5 is an explanatory view showing a relationship between the energy of α-rays and the range thereof.

FIG. 5 shows a relationship between the energy of α-rays and the range thereof. In an area below the curve in FIG. 5, only a part of the energy is used for the excitation, while in an area above the curve, all the energy is used for the excitation. Accordingly, in the case of the scintillator layer with the thickness of 3 mg/cm², only a part of the energy of α-rays of Am-241 and Po-214 contributes to the light emission. Also, in the case of the scintillator layer with the thickness of 5 mg/cm², all the energy of α-rays of Am-241 contributes to the light emission, while only a part of the energy of α-rays of Po-214 contributes to the light emission. As a result, in the case of the scintillator layer with the thickness of 5 mg/cm² or less, the quantity (pulse height) of light emitted by α-rays of Am-241 is not substantially different from the quantity (pulse height) of light emitted by α-rays of Po-241. On the other hand, in the case of the scintillator layer with the thickness of 8 mg/cm², all the energy of α-rays of Am-241 and Po-214 contributes to the light emission, whereby the quantity of emitted light (pulse height) is made to correspond to the energy (range). Accordingly, it is possible to perform pulse height discrimination suitable for a target nuclear species (energy) by selecting an optimal scintillator layer thickness corresponding to the range of α-rays emitted from the target nuclear species, on the basis of the relationship between the range of α-rays and the energy thereof shown in FIG. 5.

Figure 6B:
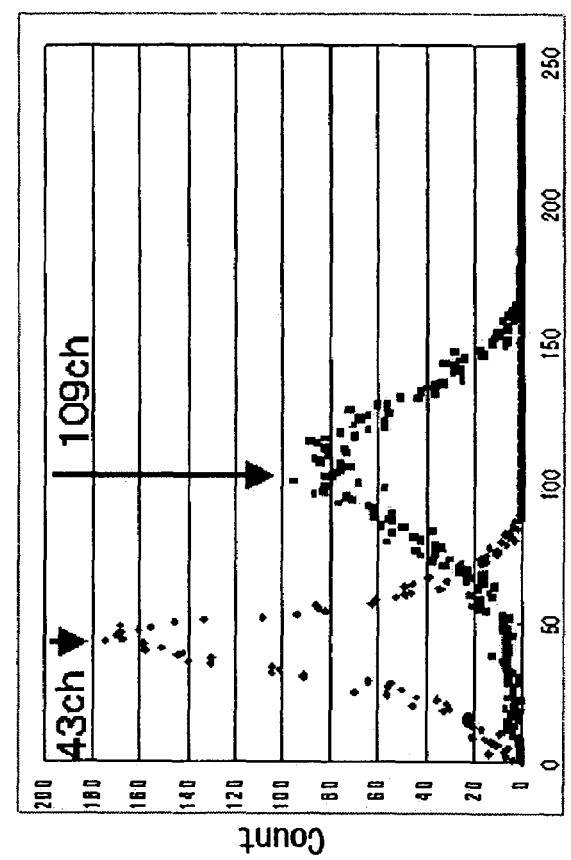
FIGS. 6A and 6B are explanatory views showing examples of α-ray spectra obtained by experiments.
Figure 6A:
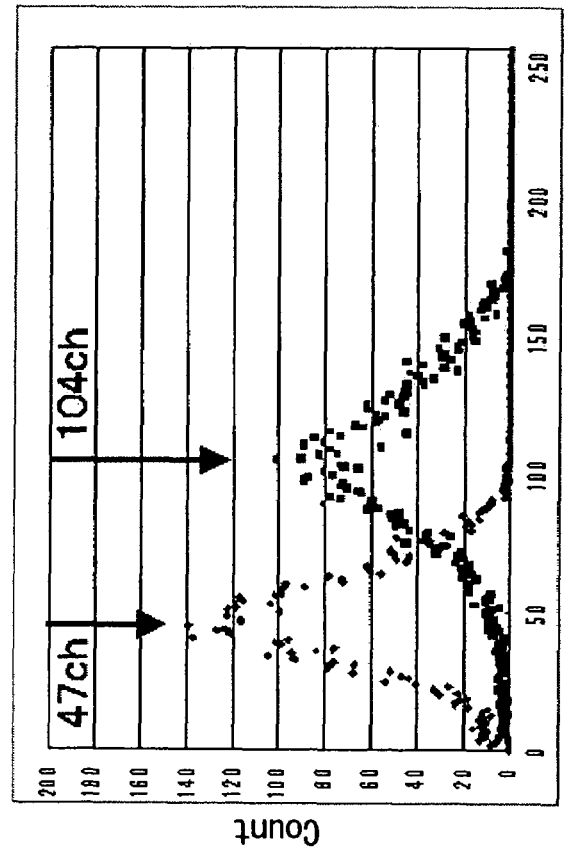

The α-ray spectra of Am-241 (radioactive material to be detected) and of the progenies of radon have been measured using five kinds of ZnS (Ag) scintillators which are different from each other in the particle diameters and the layer thickness. FIGS. 6A and 6B show examples of the obtained α-ray spectra. Here, FIG. 6A shows the case where the particle diameter and the layer thickness of scintillator are 10 μm and 10 mg/cm², respectively, and FIG. 6B shows the case where the particle diameter and the layer thickness of scintillator are 5 μm and 10 mg/cm², respectively. In FIG. 6A, the peak of the α-ray spectrum of Am-241 occurs at 47 channel and the FWHM is 37 channels, and the peak of the α-ray spectrum of the progenies of radon occurs at 104 channel, while in FIG. 6B, the peak of the α-ray spectrum of Am-241 occurs at 43 channel and the FWHM is 24 channels, and the peak of the α-ray spectrum of the progenies of radon occurs at 109 channel. The FWHM is the number of channels at which the height of a spectrum is half the peak of the spectrum, and the smaller FWHM means the higher resolution and hence leads to improvement in the separation accuracy. It can be seen from FIGS. 6A and 6B that an ZnS (Ag) scintillator with smaller particle diameter has a better resolution.

Next, the boundary value between the energy region of α-rays from Am-241 (radioactive material to be detected) and the energy region of α-rays from the progenies of radon is defined, and the influence rate of α-rays from the progenies of radon (a rate of the count of α-rays from the progenies of radon lower than the boundary value with respect to the total count of α-rays from the progenies of radon) has been investigated. The influence rate of each scintillator is shown in Table 1.

TABLE 1

| Kinds of scintillator (Particle diameter-thickness) | Influence rate of α rays from progenies of radon |
| --- | --- |
| 5 μm - 5 mg/cm² | 40.3% |
| 5 μm - 10 mg/cm² | 23.3% |
| 10 μm - 3 mg/cm² | 97.5% |
| 10 μm - 5 mg/cm² | 67.3% |
| 10 μm - 10 mg/cm² | 29.6% |

As a result of the experiments, it has been confirmed that a ZnS (Ag) scintillator with smaller particle diameter and greater thickness has a smaller influence rate of α-rays from the progenies of radon. Among the five kinds of ZnS (Ag) scintillators, the influence rate of α-rays is the smallest in the case of the scintillator with the particle diameter of 5 μm the thickness of 10 mg/cm². Further, it can be seen from the above described mechanism of pulse height discrimination shown in FIGS. 4A and 4B that the influence rate of α-rays is further reduced by making the particle diameter smaller (for example 3 μm and the like), and by setting the thickness to about 8 mg/cm², as a result of which the separation accuracy can be further improved.

What is claimed is:

1. A ZnS (Ag) scintillation detector comprising a ZnS (Ag) scintillator layer which is excited by incident α-rays and emits a scintillator light, a photomultiplier tube which converts the scintillator light into an electric pulse signal, and a counting rate meter which counts the obtained pulse signal, said detector being capable of separating α-rays from a radioactive material to be detected from α-rays from naturally occurring nuclides, wherein said ZnS (Ag) scintillator layer has a thickness which substantially coincides with a range of α-rays from the naturally occurring nuclides to be separated, and wherein a pulse height discrimination circuit which discriminates between the energy region of α-rays from the radioactive material to be detected and the energy region of α-rays from the naturally occurring nuclides, is present at a stage preceding said counting rate meter, to thereby perform pulse height discrimination of signals in an energy region of α-rays from the radioactive material to be detected and guide the discriminated signals to the counting rate meter, thereby reducing the influence of α-rays from the naturally occurring nuclides on the counting of α-rays from the radioactive material to be detected.

2. The ZnS (Ag) scintillation detector according to claim 1, wherein the α-rays from naturally occurring nuclides are progenies of radon and wherein the scintillator layer has a structure in which the thickness of the layer is greater than 5 mg/cm², and ZnS (Ag) scintillators with a particle diameter of 5 μm or less are evenly packed in the layer.

* * * * *